United States Patent [19]

Carroll

[11] Patent Number: 5,046,683

[45] Date of Patent: Sep. 10, 1991

[54] CASSETTE REEL SPRING TIP CONFIGURATION

[76] Inventor: William M. Carroll, 1111 E. Dean Rd., Milwaukee, Wis. 53217

[21] Appl. No.: 379,228

[22] Filed: Jul. 13, 1989

[51] Int. Cl.$^5$ .......................... G03B 1/04; G11B 15/32
[52] U.S. Cl. .................................... 242/199; 360/132; 267/158
[58] Field of Search ................ 360/132; 242/197–200; 72/339; 267/52, 158

[56] References Cited

U.S. PATENT DOCUMENTS

| | | | |
|---|---|---|---|
| 4,496,118 | 1/1985 | Oishi et al. | 242/198 |
| 4,546,936 | 10/1985 | Okamura et al. | 242/199 X |
| 4,717,091 | 1/1988 | Schoettle et al. | 242/199 |
| 4,747,007 | 5/1988 | Ikebe et al. | 242/199 X |
| 4,770,367 | 9/1988 | Carroll | 242/199 |

Primary Examiner—Daniel P. Stodola
Assistant Examiner—Paul Thomas Bowen
Attorney, Agent, or Firm—Kinzer, Plyer, Dorn, McEachran & Jambor

[57] ABSTRACT

A reel spring for use in a magnetic tape cassette has an elongated central base portion and adjoining end portions extending out of the plane of the base. The spring has first and second parallel side edges and terminates at transversely extending tip edges. The tip edges are joined to the side edges by cutout edges such that the width of each tip edge is less than that of the overall spring. The method for making the reel spring includes the steps of feeding a continuous strip of spring material into a shaping die for cutting and forming the strip into a finished spring. An end portion of the continuous strip material is severed from the continuous strip to form an individual spring blank. This is done by removing a pair of facing cutouts from the side edges of the strip at the appropriate location and slitting the strip in the area of the two cutouts. The blank is then formed into a finished spring.

6 Claims, 1 Drawing Sheet

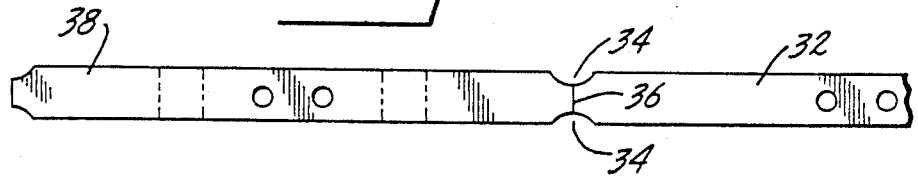
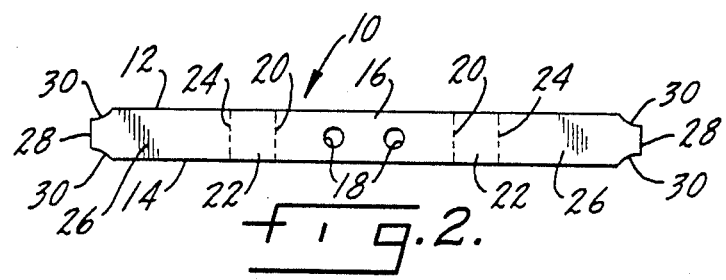
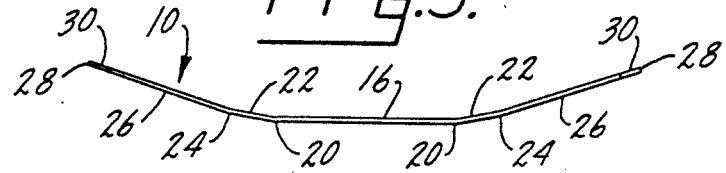
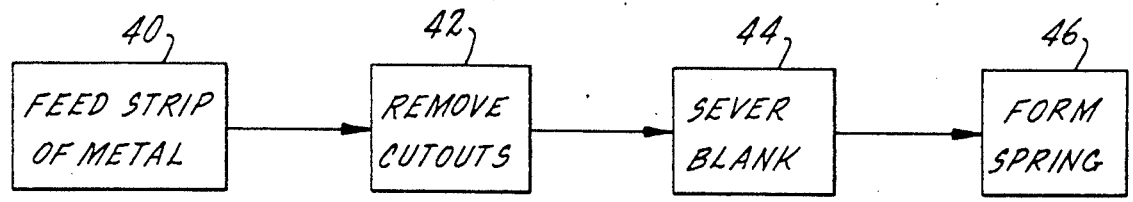
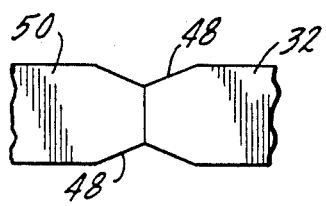
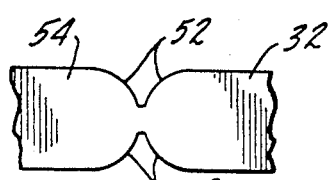
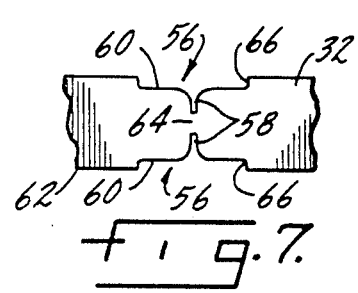

CASSETTE REEL SPRING TIP CONFIGURATION

BACKGROUND OF THE INVENTION

This invention relates to a reel spring for magnetic tape cassettes and to a method for making the spring. Reel springs are used in a cassette to rotatably mount the tape reel therein. Examples of prior art reel springs are shown in Schoettle, U.S. Pat. 4,717,091.

The manufacture of prior art springs is encumbered with certain disadvantages. Production of Schoettle,s spring occasions a certain amount of waste of the raw material. This waste is brought about by either the tip configuration used or the overall shape of the spring. In the rounded tip configuration shown in Schoettle no part of one spring adjoins the following spring in the strip of raw material and a segment of material the axial length of the tip spacing between adjacent springs is wasted.

Schoettle also suggests completely eliminating any waste or loss of raw material by simply slitting straight across the raw material to form springs which are elongated rectangles. While this is the optimum spring configuration from the standpoint of material usage, it unfortunately results in a spring of diminished utility. The problem with a completely rectangular spring is the sharp corners tend to catch or hang up on the tape reels. This operational defect of the rectangular spring, outweighs its manufacturing advantages.

SUMMARY OF THE INVENTION

The reel spring of the present invention combines the operational and manufacturing advantages of prior springs while eliminating or reducing the manufacturing disadvantage thereof.

The spring of the present invention is an elongated strip of stainless steel having first and second side edges which are parallel to one another. The spring terminates at transversely extending tip edges. The tip edges are joined to the side edges by cutout edges which define cutout portions such that the width of each tip edge is less than that of the overall spring. That is, the corners are cut away, cut out or chamfered so that they are something other than square corners.

The spring just described is made according to the following method. A strip of spring material having parallel side edges is fed into a shaping die for cutting and forming the strip into a finished spring. The strip has a width equal to the width of the finished spring. Individual spring blanks are severed from the end of the continuous strip by removing a pair of facing cutouts from the side edges of the strip to form a pair of cutout edges. The cutouts extend partially across the width of the strip. The strip is slit in the area between the two cutouts to form a transverse tip edge extending between the cutouts. The transverse tip edge has a width less than that of the strip. Once the blank has been severed from the continuous strip material, it is formed into a finished spring.

In one embodiment each cutout has a shape similar to a brace symbol (}) having a central peak. The slit bisects the peaks of facing cutouts. In another embodiment the cutouts are arcuate and the location of the slit bisects the arc, leaving a symmetrical cutout edge on both sides of the blank.

BRIEF DESCRIPTION OF THE DRAWINGS

FIG. 1 is a schematic plan view of the continuous strip material as it would appear during the manufacture of reel springs.

FIG. 2 is a plan view of the spring of the present invention.

FIG. 3 is a side view of the spring of FIG. 2.

FIG. 4 is a block diagram illustrating the steps of the method of the present invention.

FIGS. 5, 6 and 7 are enlarged, partial plan views of modified forms of the invention.

DETAILED DESCRIPTION OF THE INVENTION

One form of reel spring 10 according to the present invention is illustrated in FIGS. 2 and 3. The spring is an elongated strip of nominally rectangular configuration having cutout edge portions such that the corners of the spring are not square. The spring has first and second parallel side edges 12 and 14 which extend substantially throughout the length of the strip. The spring has a flat, central base portion 16 which is adapted to adjoin the surface of the cassette case when the spring is installed. A pair of holes 18 are provided in the base to facilitate attachment of the spring to the cassette.

A pair of transverse crimps or fold lines 20 determine the extent of the base portion 16 and partially define transition portions 22 of the spring. The transition portions extend out of the plane of the base at an angle compared to the base portion 16. This is best seen in FIG. 3. In the embodiment shown, the angle is 10°. A second set of transverse crimps or fold lines 24 determines the extent of the transition sections 22. Crimps 24 define outer portions 26 of the spring which extend at a second, sharper angle to the plane of the base portion 16. In the embodiment shown, the second angle is 17°. For reference purposes only, the overall length of the spring when flat may be about four inches.

The outer portions 26 terminate at transverse tip edges 28. The tip edges are joined to the first and second side edges 12 and 14 by cutout edges 30. The cutout edges extend inwardly, i.e., toward the longitudinal center line of the spring, such that the width of the tip edges 28 is less than the distance between the side edges 12 and 14. While the cutout edges are shown having a concave configuration, it could be otherwise. For example, as illustrated in FIG. 5, the cutout edges 48 could be straight lines, imparting a chamfered or beveled effect to the ends of the spring 50. Or, as illustrated in FIG. 6, the cutout edges 52 could be curved lines, defining a connecting tab 53. This arrangement provides a convex configuration to the ends of the spring 54. The connecting tab 53 has a width approximately equal to the width of the slitting knife. The width is exaggerated in FIG. 6 for clarity.

FIG. 1 illustrates a method for making the cassette spring shown in FIGS. 2 and 3. In this method, a continuous elongated strip 32 of spring material is fed into a shaping die for cutting and forming the strip material into a finished spring. The strip 32 has a width equal to the width of the finished spring. The strip may be stainless steel having a thickness of about 0.004 to 0.008 inches and a width of about 0.348 inches. The shaping die may be of the type shown and described in U.S. Pat. No. 4,845,820, assigned to the present assignee. The disclosure of that patent is incorporated herein by reference.

The springs are formed from the strip in end-to-end fashion. That is, an individual spring blank is severed from the end of the strip and then formed into a finished spring. Once the blank is severed, the forming process includes imparting the crimp lines 20 and 24 to bend the blank into the configuration shown in FIGS. 2 and 3.

The severing operation involves removing a pair of facing cutout 34 from the side edges of the strip 32. The cutouts extend partially across the width of the strip so removal of the cutouts alone does not sever the spring blank from the elongated continuous strip 32. The radius of the arcuate cutout may be approximately 0.175 inches.

Complete separation of the blank is achieved by slitting the strip in the area between the two cutouts 34. In the embodiment shown, the strip is cut along the line 36 to form the tip edges 28 of successive springs. Although no width is shown in FIG. 1 for the slit line 36, it will be understood that in actuality the slitting knife will have a small width. The tip edges may have a length of about 0.200 inches. Once the slit along line 36 is made, the spring blank 38 is severed from the adjacent strip material. The blank can then be formed into a finished spring.

The process continues by feeding the remaining continuous strip material 32 forwardly into position for removing the next set of cutouts and slitting to create the next blank. It can be seen that removal of the cutouts 34 and slitting along the line 36 result in formation of the cutout edges 30 and tip edges 28, respectively.

FIG. 4 outlines the steps of the method. As shown at block 40, the strip material is fed into the shaping die. Next, at block 42, the cutouts are removed from the side edges of the strip material. A blank is severed, 44, from the end of the strip by slitting in the area between the cutouts. The removal of the cutouts and the slitting in the area between the cutouts may be done sequentially or simultaneously. Once a blank is removed from the end of the continuous strip, it is formed into a finished spring, as indicated at 46.

Another form of the invention is shown in FIG. 7. In this embodiment the cutout 56 is shaped similarly to a brace symbol ({) having a central peak 58. That is, the cutout forms a generally brace-shaped curve 60 having a peak 58. The spring 62 is severed from the strip 32 by slitting across a connecting tab 64 at the center of the facing peaks 58. The tab 64 has a width approximately equal to the width of the slitting knife. The resulting spring has rounded corners at the transverse edges. Also, this configuration eliminates the need to feather the cutout into the side edges of the strip. Feathering is eliminated by making the initial cut 66 roughly perpendicular to the side edges. Other advantages of this embodiment are longer die life and elimination of waste between the spring ends. For reference purposes, the overall spring width may be about .324 inches.

The advantages of the spring 10 of the present invention and the method for making it are that it produces minimal waste during production while eliminating the possibility of catching or grabbing the tape reels in operation. While a preferred form of the invention has been shown and described, it will be realized that changes may be made thereto without departing from the scope of the following claims.

I claim:

1. In a magnetic tape cassette, a reel spring comprising an elongated strip of resilient material having first and second parallel edges extending substantially throughout its length, the spring having a central base portion and adjoining end portions extending out of the plane of the base portion with the end portion terminating at transversely extending tip edges which are perpendicular to the parallel edges, the tip edges adjoining relieved cutout edges which adjoin the first and second parallel edges such that the width of the each tip edge is less than that of the strip.

2. The reel spring of claim 1, wherein at least one of the cutout edges is curved.

3. The reel spring of claim 1 wherein the end portions of the strip further include a first pair of transverse crimps at the end of the base portion defining transition sections of the strip extending at a first angle to the plane of the base portion, and a second pair of traverse crimps at the outer ends of the transition sections defining outer portions of the strip which extend at a second angle to the plane of the base portion.

4. The reel spring of claim 1 further comprising means for mourning said reel spring to the cassette, said means being formed in the base portion.

5. The reel spring of claim 1 wherein the spring defines as continuous surface between the first and second edges.

6. In a magnetic type cassette reel spring comparing an elongated strip of resilient material having first and second parallel edges extending substantially throughout its length, the spring having a central base portion and adjoining end portions extending out of the plane of the base portion with the end portions terminating at transversely extending tip edges which are perpendicular to the parallel edges, the pipe dates adjoining relieved cutout edges which adjoin the first and second edges such that the width of each tip edge is less than that of the strip, the relieved cutout edges each having a generally s-shaped configuration including an initial cut substantially perpendicular to a parallel edge at a point longitudinally spaced form the tip edge, the initial cut adjoining a longitudinal portion which extends to a generally transverse peak portion adjacent the tip edge, the junctions between the initial cut, longitudinal portion and peak portion having a radius.

* * * * *